United States Patent [19]

Laycock

[11] Patent Number: 4,962,281
[45] Date of Patent: Oct. 9, 1990

[54] SYNTHESIS OF STEREOREGULAR POLY(PROPYLENE OXIDE)

[75] Inventor: David E. Laycock, Sarnia, Canada

[73] Assignee: The Dow Chemical Company, Midland, Mich.

[21] Appl. No.: 396,576

[22] Filed: Aug. 21, 1989

Related U.S. Application Data

[63] Continuation-in-part of Ser. No. 808,803, Dec. 13, 1985.

[51] Int. Cl.$^5$ .............................................. C08G 65/10
[52] U.S. Cl. .................................. 528/413; 528/410; 528/412; 528/415; 528/416
[58] Field of Search ............... 528/410, 412, 413, 415, 528/416

[56] References Cited

U.S. PATENT DOCUMENTS

| | | | |
|---|---|---|---|
| 3,117,998 | 1/1964 | Cosby | 568/620 |
| 3,539,648 | 11/1970 | Orkin | 568/620 |
| 3,941,849 | 3/1976 | Herold . | |
| 4,265,783 | 5/1981 | Hinze . | |
| 4,282,387 | 8/1981 | Olstowski et al. . | |
| 4,299,993 | 11/1981 | Bethea et al. . | |
| 4,303,782 | 12/1981 | McHale et al. | 528/416 |
| 4,564,671 | 1/1986 | Mueller | 568/617 |
| 4,728,722 | 3/1988 | Mueller | 528/416 X |

OTHER PUBLICATIONS

G. W. Brindley et al., *American Mineralogist*, 64, 836–842, (1979).
Shigeo Miyata, *Clay and Clay-Minerals*, 23, 369–375, (1975).
Makromol. Chem. Rapid Commun., *Polymerization of Propylene Oxide by Calcined Synthetic Hydrotalcite*, S. Kohjiya, Toshihiko Sato, T. Nakayama, S. Yamashita, 231–233, (1981).
Bull. Chem. Soc. Jpn., *The Polymerization of β-Propiolactone by Calcined Synthetic Hydrotalcite*, T. Nakatsuka et al., 52, 2449–2450, (1979).
Journal of Catalysis, Walter T. Reichle, *Catalytic Reactions by Thermally Activated, Synthetic, Anionic Clay Minerals*, 94, 547–557, (1985).
J. Furukawa, T. Saegusa, "Polymerization of Aldehydes and Oxides", Interscience, New York, N.Y. 1963 Chapter 3.

*Primary Examiner*—Earl Nielsen
*Attorney, Agent, or Firm*—Paula Sanders Ruhr

[57] ABSTRACT

Stereoregular, crystalline, isotactic poly(propylene oxide) is prepared using an effective concentration of a hydrotalcite type catalyst in a process conducted above a temperature of about 100° C. and below about 130° C.

14 Claims, No Drawings

SYNTHESIS OF STEREOREGULAR POLY(PROPYLENE OXIDE)

CROSS-REFERENCE TO RELATED APPLICATION

This is a continuation-in-part of co-pending application Ser. No. 808,803 filed Dec. 13, 1985.

BACKGROUND OF THE INVENTION

This invention is related to processes for the preparation of polyols in the presence of a heterogeneous catalyst. More specifically, this invention is related to processes for the preparation of stereo-regular, crystalline, isotactic poly(propylene oxide).

Poly(alkylene oxides) are useful as solvents, surfactants, metal cutting oils, hydraulic fluids and as chemical intermediates in the manufacture of polyurethanes.

Various methods are known for the preparation of poly(alkylene oxides). These methods generally comprise the polymerization of one or more asymmetrical epoxides in the presence of appropriate catalysts. For example, U. S. Patent 3,135,705 teaches that certain unsymmetrically substituted epoxides may be homopolymerized or copolymerized using as a catalyst an organoaluminum compound that has been reacted and/or complexed with water prior to being used as a catalyst. It was taught that the proper selection of an organo-aluminum compound reacted with water could result in the selective formation of either a crystalline polymer or an amorphous polymer. E. J. Vandenberg, *J. Polym. Sci.* B, 2, 525 (1969) discusses epoxide polymerization including useful catalysts and the stereochemistry of the polymers obtained.

The known catalyst systems capable of selectively producing stereoregular or crystalline polymers have various drawbacks including the expense or toxicity of the catalysts, undesirably slow rates of polymerization and the production of polymers with less than desirable characteristics.

SUMMARY OF THE INVENTION

The present invention is a process for the preparation of stereoregular, crystalline, isotactic poly(propylene oxide) comprising polymerizing propylene oxide at a temperature of at least about 100° C. and no greater than about 130° C. in the presence of an amount ranging from about 0.05 weight percent to no more than about 10 weight percent of a particulate solid formed by calcining, at a temperature of at least about 450° C. and no greater than about 600° C., a solid particulate having hydrotalcite structure under conditions sufficient to produce the stereoregular, crystalline, isotactic poly(propylene oxide).

It is surprising that the process of the present invention results in the selective formation of crystalline, isotactic poly(propylene oxide) having desirable characteristics.

The stereoregular, crystalline, isotactic poly(propylene oxide) produced by the process of this invention may be used in the preparation of polyurethanes or may be used as solvents, surfactants, metal cutting oils or hydraulic fluids.

DETAILED DESCRIPTION OF THE ILLUSTRATIVE EMBODIMENTS

Any epoxide which will react in the process of this invention to form a stereoregular, crystalline, isotactic poly(propylene oxide) may be used in the practice of this invention. It is preferred that the epoxide is 1,2-propylene oxide.

In addition to the epoxide, active hydrogen initiators may be used in the process of this invention although their use is not required or preferred. Examples of active hydrogen initiators which may be used in this invention include alcohols, organic amines, mercaptans and mixtures thereof.

Antioxidants may also be used in the practice of this invention. It is preferred to use known antioxidants such as hindered phenol types. Non-limiting examples of hindered phenols include compounds such as butylated hydroxy toluene. Other useful antioxidants include phenothiazine and substituted phenothiazine.

Catalysts useful in the process of the present invention are formed by calcining a particulate solid having hydrotalcite structure and comprising the components:
(a) aluminum;
(b) at least one secondary metal;
(c) oxygen bonded to aluminum and the secondary metal(s): and
(d) at least one Lowry-Bronsted anionic The components a, b, c and d are present in proportions such that the solid particulate has hydrotalcite structure and provides the desired activity upon calcination.

As stated above, the hydrotalcite type catalysts of the present invention are catalysts containing the components listed in the preceding paragraph and having hydrotalcite structure. Hydrotalcite structure is characterized by positively charged metal oxide/hydroxide layers with anions located interstitially to neutralize this positive charge. This structure is found in naturally occurring hydrotalcite as discussed by, for example, Reichle in *Journal of Catalysis*, 94. 547-557 (1985) and Brindley et al., *American Mineralogist*, 64-, 386-842 (1979).

The catalysts preferably employed in this invention include calcined hydrotalcite and calcined synthetic hydrotalcite (available commercially from Kyowa Chemical Industry Co., Ltd. of Japan in calcined or non-calcined forms). The catalysts may also be prepared by calcining the catalyst precursors prepared by the procedure described by Miyata in *Clay and Clay-Minerals*, 23, 369-375 (1975), now incorporated by reference. Mixtures of catalysts may be used in this process.

While properties of the catalyst depend upon the catalyst composition and method of preparation and are not critical to the practice of this invention, typically the precalcined catalyst has a BET surface area of about 10 m$^2$/g, and an average particle size between about $6 \times 10^{-5}$ M and about $1 \times 10^{-3}$ M While the particle size of the catalyst does not change upon calcination, the surface area increases to about 100 m$^2$/g to about 200 m$^2$/g. The pH of 1 g of calcined catalyst in 0.05 liter of water is typically greater than about 11.

Typically all catalysts which, prior to calcining, have the hydrotalcite-type structure, as demonstrated for example by X-ray diffraction, show the desired activity.

The secondary metal is any metal other than aluminum which, with aluminum and the appropriate anionic species, will form a compound having the hydrotalcite structure prior to calcining. The secondary metal is preferably an M$^{2+}$ metal. Non-limiting examples of M$^{2+}$ metals useful as the secondary metal in the practice of this invention include magnesium, zinc, nickel cobalt, copper and mixtures thereof. When a mixture of $M^{2+}$ metals is used, it is preferred to use a zinc/copper mixture or a nickel/zinc mixture.

In the precalcined catalyst, preferably only one secondary metal is present in appreciable amounts (i.e., 2 weight percent or more based on aluminum). More preferably only one secondary metal is present and the mole ratio with aluminum is between about 10:1 and about 2:1. The secondary metal is preferably magnesium, copper, zinc or mixtures thereof, more preferably magnesium. Preferably, the ratio of magnesium to aluminum is less than about 10:1, more preferably less than about 5:1. Preferably the ratio of magnesium to aluminum is greater than about 2:1, more preferably greater than about 3:1.

Preferably, the Lowry-Bronsted anionic base is $CrO_4^{-2}$, $SO_4^{-2}$, $CO_3^{-2}$, $NO_3^-$, $Cl^-$, or $ClO_4^-$. More preferably, the Lowry-Bronsted anionic base is $CO_3$ $NO_3^-$. Most preferably, the Lowry-Bronsted anionic base is $CO_3^{-2}$. The Lowry-Bronsted anionic base is preferably present in a mole ratio of base to aluminum between about 0.4:1 and about 1 5:1. Preferably, the mole ratio is greater than about 0.5:1, more preferably greater than about 0.7:1 and most preferably greater than about 0.9:1. Preferably, the mole ratio is less than about 1.3:1 and most preferably less than about 1.2:1.

For the purposes of this invention, calcining is heating a catalyst precursor at a temperature of about 450° C. until the catalyst precursor is a constant mass. Alternatively, calcining is the heating of a catalyst precursor until there is a sharp endothermic reaction between a temperature of about 250° C. and about 600° C. The reaction must result in about a 10 percent decrease in the weight of the catalyst precursor at the calcining temperature based on the weight of the catalyst precursor at 100° C. as shown in a thermodifferential gravimetric analysis. The catalyst precursor is calcined in a non-reactive container in the presence of air. The catalyst precursor may be calcined at temperatures between about 350° C. and about 600° C.

A diluent may be used although it is not required. It is advantageous to employ a reaction diluent when the product is a thick liquid or a solid. Reaction diluents may also be used to assist removal of the catalyst reaction product, should such be desired. It should be noted that removal of the catalyst from the product is typically not required when the catalyst is used at low concentrations. Reaction diluents can be any essentially unreactive fluid or mixture of fluids which will dispense the reactants and from which the product can be recovered. Hydrocarbon solvents such as hexane isooctane, heptane, cyclohexane, benzene, toluene, xylene, orthodichlorobenzene, petroleum ether, monochlorobenzene, diethyl ether, tetrahydrofuran, 1,4-dioxane, tetraethylene glycol, dimethyl ether, isopentyl ether, and mixtures thereof are examples of diluents which may be useful. The reaction diluent, when used, is present in an amount sufficient to transport the reactants and products. Typical weight ratios of reaction diluent to reactants are between about 1:1 to about 20:1. Preferably, the weight ratio of reaction diluent to reactants is greater than about 3:1, more preferably greater than about 9:1. Preferably, the weight ratio of reaction diluent to reactants is less than about 18:1, more preferably less than about 15:1.

To ease control of the heat generated by the reaction, the epoxide concentration is kept low. By low epoxide concentration is meant that addition of a small amount of the epoxide will increase the reaction rate. The preferred concentration of the epoxide is dependent upon particular epoxide(s), diluent(s), diluent(s) concentration, catalyst, catalyst concentration, pressure, temperature and the like. Typical epoxide concentrations are between about 1 and about 25 weight percent based on total weight of reactants and diluent. Concentrations are more preferably between about 8 and about 12 weight percent.

In the process for the preparation of stereoregular, crystalline, isotactic poly(propylene oxide), temperature and catalyst concentration are important variables. Temperatures useful in the practice of the present invention range from about 100° C. to about 130° C. Useful catalyst concentrations range from about 0.05 weight percent based on the monomer to about 10 weight percent with concentrations of less than about 5.0 weight percent being preferred. It is most preferred to use a low temperature in conjunction with a high catalyst concentration or a high temperature in conjunction with a low catalyst concentration in order to maximize the formation of stereoregular, crystalline, isotactic poly(propylene oxide).

In a preferred embodiment, the catalyst is calcined at a temperature of about 450° C. to 500° C. The catalyst concentration is at least about 0.5 weight percent and less than about 5.0 weight percent based on the monomer and the polymerization is conducted at a temperature of at least about 110° C. and no greater than about 130° C. In a more preferred embodiment, the catalyst concentration is about 0.5 weight percent and the polymerization is conducted at a temperature of about 130° C.

The instant invention may be practiced in many modes such as semi-batch and batch processes. Semi-batch processes are preferred.

A semi-batch process is carried out in the following manner. First a stirred reactor is charged with the reactive hydrogen initiator, if used, and then with catalyst and any reaction diluent and/or antioxidant in any order. Second, the reactor is vacuum-purged with an unreactive gas such as nitrogen and sealed. Third, the sealed reactor is heated to the desired reaction temperature. Fourth, the epoxide is added until the desired reaction pressure is reached. Fifth, the epoxide is added only as needed to keep the pressure at the desired pressure. Sixth, after all the epoxide has been added, a period of digestion is observed when the reactor is kept at the desired temperature until the pressure drops to less than 2 psig (13.8 kPa). The reactor is then cooled, opened and the reaction product removed. The resulting polymer may be fractionated from dilute acetone solution at from about $-20°$ to about $-30°$ C. thus isolating the crystalline isotactic poly(propylene oxide) from the amorphous polymer. Essentially all of the reactants react and there are no significant by-products.

The instant invention can be carried out in a semi-batch fashion at ambient pressures. For this process, pressures below 100 psig (689 kPa) are preferred. Pressures below about 60 psig (413 kPa) are more preferred. In addition, pressures below ambient can be used. While pressure or lack of pressure is not a detriment to the process of the instant invention, it is more convenient to carry out the reaction in the pressure range of from about atmospheric to about 100 psig (689 kPa).

In the lesser preferred batch process, (1) the catalyst, initiator, if used, and epoxide are agitated together in a reactor with any reaction diluent and/or antioxidant until the reaction is complete and (2) the product is separated. The reaction can be carried out at ambient pressures. Pressures below 100 psig (689 kPa) are preferred Pressures below about 60 psig (413 kPa) are more preferred. In addition, pressures below ambient can be used. While pressure or lack of pressure is not a detriment to the process of the instant invention, it is more convenient to carry out the reaction in the pressure range of from about atmospheric to about 100 psig.

The following non-limiting examples are provided to illustrate the invention and should not be construed as limiting it in any way. Unless stated otherwise, all parts and percentages are by weight.

The following general procedure is followed to prepare the poly(propylene oxide).

The catalyst is charged to the reactor. Initiator, if used, antioxidant, if used and diluent are added next. The reactor is then sealed, vacuum/nitrogen purged and heated to the temperature at which the reaction will be carried out. Propylene oxide is then fed to the reactor to a pressure which will insure an unreacted oxide concentration of about 15 percent at the particular reaction temperature. Oxide feed is delayed for the initial induction period and then continued at a rate sufficient to maintain a constant pressure. When the desired quantity of oxide has been added to the reactor, the reaction contents are allowed to digest. The end of this reaction period is noted by a pressure drop to less than about 2 psig (13.8 kPa). The reactor contents are then emptied, filtered to remove residual catalyst, if it is desired to recycle the catalyst, and flashed to remove diluent and any remaining oxide. The heat of fusion of the resulting polymer is measured by differential scanning calorimetry. The polymer is then fractionated from dilute acetone solution at about −30° C. to separate the crystalline isotactic poly(propylene oxide) from the amorphous poly(propylene oxide). The crystalline isotactic poly(propylene oxide) is characterized by $^{13}C$ NMR. The polymer so produced is suitable for use in urethane applications.

EXAMPLE 1

Synthetic hydrotaloite (DHT-4T) is obtained from Kyowa Chemical Industry Company, Ltd. of Japan. The synthetic hydrotalcite is calcined at a temperature of about 500° C. This catalyst is used in the process described above. The results obtained are shown in Table 1 below.

TABLE I

| Catalyst Concentration (Wt. %)[1] | Propylene Oxide (g) | Reaction Temp. (°C.) | $H_f$[2] (J/g) | Induction Time[3] (hr) | Reaction Time[4] (hr) |
|---|---|---|---|---|---|
| 1.6 | 2769 | 110 | 8.14 | 0.7 | 6.5 |
| 0.9 | 3450 | 110 | 8.75 | 4.0 | 7.0 |
| 0.9 | 3450 | 130 | 6.08 | 0.3 | 2.5 |
| 1.2 | 2769 | 130 | 4.88 | 1.0 | 7.5 |

[1] Weight percent based on propylene oxide.
[2] Heat of fusion.
[3] The induction time is time from initial addition of propylene oxide to first exotherm or pressure drop signaling the start of the reaction.
[4] The reaction time is time required for complete reaction of all propylene oxide.

The information in Table I above demonstrates that the process of this invention results in the relatively rapid formation of poly(propylene oxide) having a relatively high concentration of crystalline isotactic polymer as indicated by the heat of fusion.

What is claimed is:

1. A process for producing stereoregular, crystalline, isotactic poly(propylene oxide) comprising reacting, at a temperature of at least about 100° C. and no greater than about 130° C., propylene oxide in the presence of a catalytic amount of a particulate solid catalyst formed by calcining, at a temperature of about 450° C. to about 550° C., a catalyst precursor having an elemental analysis comprising:
   (a) aluminum;
   (b) at least one secondary metal:
   (c) oxygen, bonded to aluminum and the secondary metal: and
   (d) at least one Lowry-Bronsted anionic base,
in such amounts that the catalyst precursor is a solid having hydrotalcite structure, under reaction conditions sufficient to produce the stereoregular, crystalline, isotactic poly(propylene oxide).

2. The process of claim 1 wherein the amount of catalyst used is at least about 0.05 and no greater than about 10 weight percent based on the weight of the epoxide.

3. The process of claim 1 wherein the propylene oxide is 1,2-propylene oxide.

4. The process of claim 2 wherein the amount of catalyst used is at least about 0.05 and no greater than about 5.0 weight percent and the reaction temperature is at least about 110° C. and no greater than about 130° C.

5. The process of claim 4 wherein the amount of catalyst used is about 0.05 weight percent and the reaction temperature is about 130° C.

6. The process of claim 1 wherein the catalyst contains only one secondary metal.

7. The process of claim 6 wherein the secondary metal is magnesium.

8. The process of claim 1 wherein the ratio of secondary metal(s) to aluminum is greater than about 2:1 and less about 10:1.

9. The process of claim 8 wherein the ratio of secondary metal(s) to aluminum is greater than about 2:1 and less than about 5:1.

10. The process of claim 7 wherein the ratio of magnesium to aluminum is greater than about 2:1 and less than about 5:1.

11. The process of claim 10 wherein the ratio of magnesium to aluminum is greater than about 3:1.

12. The process of claim 1 wherein the Lowry-Bronsted anionic base is $CO_3^{-2}$.

13. The process of claim 1 wherein the Lowry-Bronsted anionic base is $NO_3^{-}$.

14. The process of claim 1 wherein no active hydrogen initiator is used.

* * * * *

UNITED STATES PATENT AND TRADEMARK OFFICE
CERTIFICATE OF CORRECTION

PATENT NO. : 4,962,281

DATED : October 9, 1990

INVENTOR(S) : David E. Laycock

It is certified that error appears in the above-identified patent and that said Letters Patent is hereby corrected as shown below:

Column 2, line 22 "metal(s):" should correctly read --metal(s);--.

Column 2, line 23 "anionic" should correctly read --anionic base.--.

Column 2, line 54 "6 X 10-5" should correctly read --6 X $10^{-5}$--.

Column 2, line 54 "1 X 10-3" should correctly read --1 X $10^{-3}$--.

Column 3, line 17 "Cl$^-$, or$ClO4$-" should correctly read --Cl$^-$ or ClO$_4^-$--.

Column 3, line 18 "C0$_3$" should correctly read --CO$_3^{-2}$--.

Column 3, line 22 "1 5:1" should correctly read --1.5:1--.

Column 4, line 5 "conoentrations" should correctly read --concentrations--.

Column 5, line 4 "preferred Pressures" should correctly read --preferred. Pressures--.

Column 5, line 53 "hydrotaloite" should correctly read --hydrotalcite--.

Column 6, line 26 "metal:" should correctly read --metal;--.

Column 6, line 28 "metal:" should correctly read --metal;--.

Signed and Sealed this

Seventh Day of April, 1992

*Attest:*

HARRY F. MANBECK, JR.

*Attesting Officer*  *Commissioner of Patents and Trademarks*